(No Model.)
H. WEBER.
OVEN ATTACHMENT FOR STOVES, RANGES, &c.
No. 575,185. Patented Jan. 12, 1897.
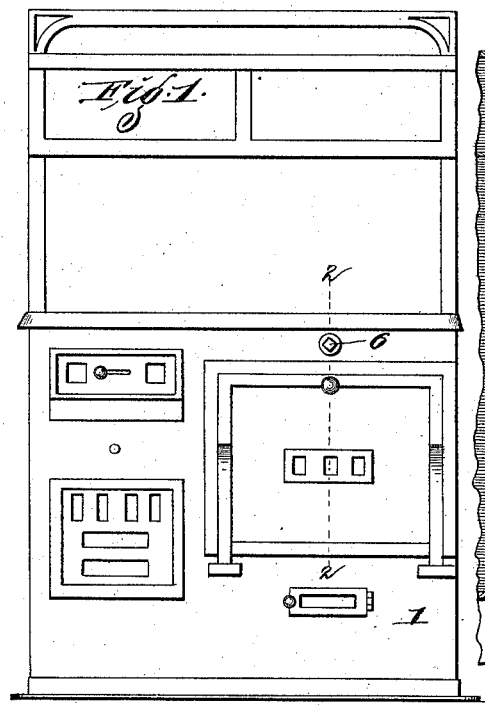
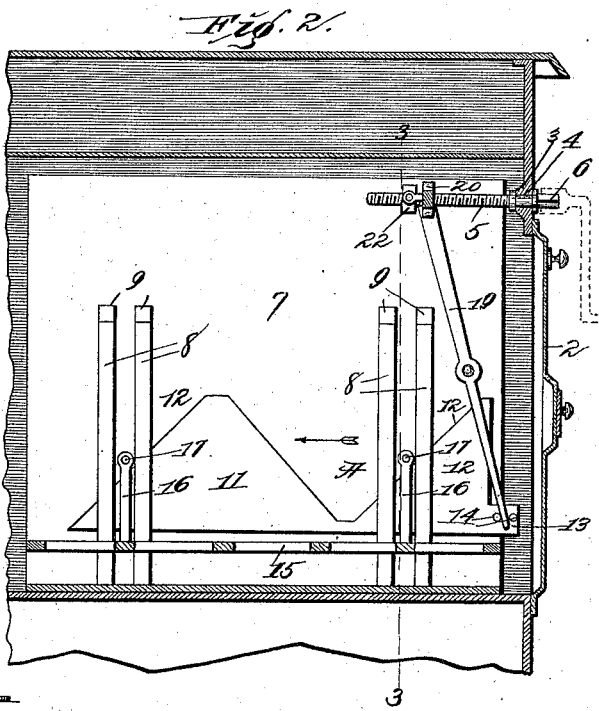
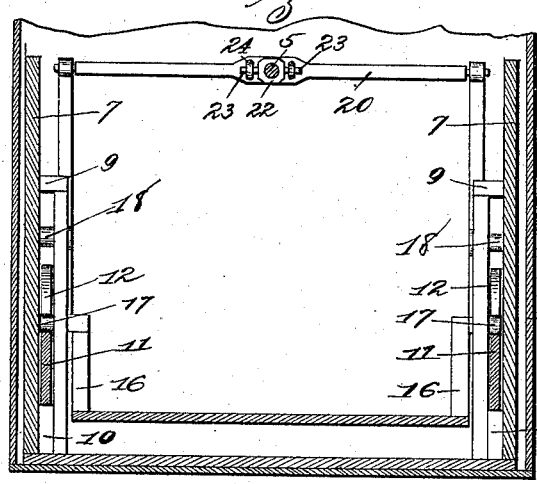
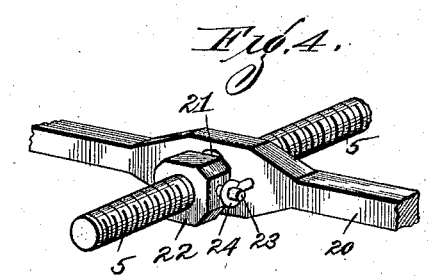
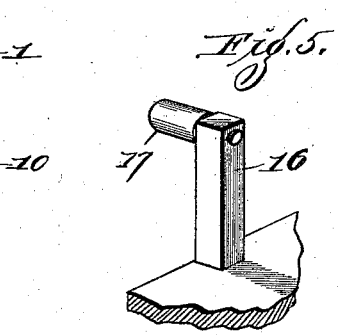
Attest:
W. Smith,
John L. Tunison.
Inventor:
Henry Weber
By Higdon & Higdon & Longan
Attys.

UNITED STATES PATENT OFFICE.

HENRY WEBER, OF ST. LOUIS, MISSOURI.

OVEN ATTACHMENT FOR STOVES, RANGES, &c.

SPECIFICATION forming part of Letters Patent No. 575,185, dated January 12, 1897.

Application filed July 10, 1896. Serial No. 598,775. (No model.)

*To all whom it may concern:*

Be it known that I, HENRY WEBER, of the city of St. Louis, State of Missouri, have invented certain new and useful Improvements in Oven Attachments for Stoves, Ranges, &c., of which the following is a full, clear, and exact description, reference being had to the accompanying drawings, forming a part hereof.

My invention relates to an oven attachment for stoves, ranges, &c.; and it consists in the novel construction, combination, and arrangement of parts hereinafter described and claimed.

In the drawings, Figure 1 is a front elevation of a range, the same having my oven attachment applied thereto as required for practical use. Fig. 2 is a vertical sectional view taken approximately on the indicated line 2 2 of Fig. 1. Fig. 3 is a vertical section taken approximately on the indicated line 3 3 of Fig. 2. Fig. 4 is a detail view in perspective of a screw-threaded shaft and a nut that I make use of in carrying out my invention. Fig. 5 is a detail perspective view of an antifriction-roller carried by the rack of my improved attachment.

Referring by numerals to the accompanying drawings, 1 indicates the stove or range casing, and 2 the oven-door therein.

Formed in the casing 1 immediately above the oven-door 2 is a boss 3, in which is formed a bearing 4, in which is journaled for rotation a screw-threaded rod 5, the outer end of which projects through the boss 3 and is squared, as indicated by the numeral 6, in order that a crank-handle may be located on said outer end to rotate the screw-threaded rod 5.

Removably located within the oven is a rectangular open-ended and open-topped casing 7, and extending upwardly from the bottom of said casing at points adjacent the sides and ends thereof are pairs of parallel bars 8, there being horizontally-arranged blocks 9 connecting the upper ends of said bars with the sides of the casing 7. Located between the lower ends of said bars 8 and the side walls of the casing are blocks 10, upon which blocks and between the pairs of bars 8 and the side walls 7 are arranged to slide plates 11, each having the pairs of parallel inclined planes 12 formed on their top edges. Lugs 13 project from the lower rear ends of these plates 11, and a pair of pins 14 project laterally from each of said lugs.

15 indicates a rack that is arranged to move vertically within the casing 7 between the pairs of bars 8, said rack being provided on its adjacent ends with standards 16, the upper ends of which carry antifriction-rollers 17, the same projecting through the pairs of parallel bars 8 and riding directly upon the inclined planes 12 of the plates 11.

Projecting laterally from the inner faces of the sides of the casing 7, adjacent one end thereof, are lugs 18, upon the outer ends of which are fulcrumed levers 19, the lower ends of which pass between the pairs of pins 14, the upper ends of said levers being pivoted upon the ends of a transversely-arranged bar 20, in the center of which is formed an aperture 21, through which the screw-threaded rod 5 passes.

22 indicates a nut that is arranged to operate in the usual manner upon the screw-threaded rod 5, and said nut is constructed with laterally-projecting pins 23, which are engaged by hooks 24, carried by the bar 20.

To raise the rack and operate my attachment, the operator locates the crank-handle upon the squared end 6 of the rod 5, as shown by dotted lines in Fig. 2, and manipulates said crank in the usual manner and in the proper direction. The nut 22, through which the rod passes, being carried by the bar 20, will ride along said rod toward the door of the oven, and this movement will necessarily actuate the levers 19, and the lower ends thereof engaging between the pins 14 will move inwardly away from the oven-door, and the plates 11 will be moved longitudinally upon the blocks 10 in the direction indicated by the arrow A in Fig. 2. As said plates 11 thus move, the antifriction-rollers 17, carried by the standards 16, which are fixed to the rack 15, will ride up the inclined planes 12 of said plates 11. Consequently said rack 15 will be elevated, this being the desired result. A reverse movement of the crank located upon the squared end 6 of the rod 5 will allow the rack 15 to lower.

An attachment of my improved construction is extremely efficient in use, inasmuch as the different articles of food while being baked can be located at different planes within an oven, and by locating the same at different elevations they will be baked uniformly throughout and said articles can be handled much easier than where a series of racks are employed in the oven.

The oven-door need not be opened while the rack is being raised or lowered, it being only necessary to turn the rod 5 with the crank-handle, as hereinbefore stated, to accomplish the desired result.

My improved attachment is simple in operation and construction, is easily and cheaply manufactured, and can be readily applied to stoves or ranges of ordinary construction, and is easily removed to be cleaned or while the oven is being cleaned.

I claim—

1. An attachment for the ovens of stoves or ranges, constructed with a suitable casing, inclined surfaces arranged for movement along the side walls of said casing, a rack arranged for vertical movement within the casing, sliding connections between said rack and said inclined surfaces, and means of moving said inclined surfaces, substantially as specified.

2. An attachment for the ovens of stoves or ranges, constructed with a suitable casing, mating inclined surfaces arranged for movement along the inner faces of said casing, a rack arranged for vertical movement within said casing, sliding connections between said rack and said inclined surfaces, connections between said inclined surfaces whereby they are moved simultaneously and means of moving said inclined surfaces, substantially as specified.

3. An attachment for the ovens of stoves or ranges constructed with a suitable casing, a pair of plates constructed with inclined planes on their top edges arranged for movement along the side walls of said casing, a rack arranged for vertical movement within the casing, standards carried thereby, antifriction-rollers carried by the upper ends of the standards, the same riding on the inclined planes and means for moving the plates carrying said inclined planes longitudinally within the casing.

4. An attachment for the ovens of stoves or ranges constructed with a suitable casing, pairs of vertical bars located adjacent the side walls of said casing, plates arranged for movement between said bars and the side walls, which plates are constructed with pairs of inclined planes, a rack arranged for vertical movement within the casing, standards carried thereby, antifriction-rollers carried by the upper ends of said standards which ride on the inclined planes, a pair of fulcrumed levers, the lower ends of which engage with the forward ends of the plates, a screw-threaded rod passing through the wall of the stove or range, a nut located upon said screw-threaded rod, and a bar fixed to said nut, the ends of which bar are pivoted to the upper ends of the fulcrumed levers.

In testimony whereof I affix my signature in presence of two witnesses.

HENRY WEBER.

Witnesses:
 EDWARD E. LONGAN,
 MAUD GRIFFIN.